United States Patent [19]

Tani

[11] 4,250,374
[45] Feb. 10, 1981

[54] PROCESS AND APPARATUS FOR THE SURFACE HEAT TREATMENT OF STEEL PRODUCTS BY A LASER BEAM

[75] Inventor: Takayuki Tani, Osaka, Japan

[73] Assignee: Sumitomo Kinzoku Kogyo Kabushiki Gaisha, Osaka, Japan

[21] Appl. No.: 49,638

[22] Filed: Jun. 18, 1979

[30] Foreign Application Priority Data

Jul. 7, 1978 [JP] Japan .................................. 53/83329

[51] Int. Cl.³ ............................................. B23K 27/00
[52] U.S. Cl. ..................... 219/121 LE; 219/121 LE; 219/121 LR; 219/121 LT
[58] Field of Search ................ 219/121 LE, 121 LF, 219/121 LP, 121 LR, 121 LT, 121 EF, 121 EG, 10.59; 148/147; 266/125, 126

[56] References Cited

U.S. PATENT DOCUMENTS

| | | | |
|---|---|---|---|
| 3,593,973 | 7/1971 | Dehn ............................ | 148/147 X |
| 4,026,732 | 5/1977 | Dammel et al. ............... | 148/147 |
| 4,151,014 | 4/1979 | Charschan et al. ........ | 219/121 LF X |

OTHER PUBLICATIONS

E. Locke, et al., *IEEE Journal of Quantum Electronics*, "Metal Processing With a High-Power $CO_2$ Laser" vol. QE-10, No. 2, pp. 179-185 Feb. 1974.
D. Dreger, *Machine Design*, "Pinpoint Hardening By Electron Beam" vol. 50, No. 24, pp. 89-94, Oct. 1978.
E. V. Locke, et al., Research Report 398 Avco Everett Research Laboratory, Inc. "High Power Laser For Metal Working", pp. 1-39, 1974.

*Primary Examiner*—C. L. Albritton
*Attorney, Agent, or Firm*—Wenderoth, Lind & Ponack

[57] ABSTRACT

A single laser beam transmitter directs a substantially parallel laser beam toward a substantially V-shaped steel surface including first and second flank surfaces. A convex lens has a focal length (f) which meets the condition of $r/f \geq 0.268$, wherein (r) is the diameter of the laser beam, and such convex lens is positioned in the path of the laser beam such that the focal point of the convex lens is between the convex lens and the V-shaped surface. The convex lens thus diffuses and diverges the laser beam from the focal point and projects the laser beam against the first and second flank surfaces at angles as close as possible to perpendicular thereto.

4 Claims, 4 Drawing Figures

PROCESS AND APPARATUS FOR THE SURFACE HEAT TREATMENT OF STEEL PRODUCTS BY A LASER BEAM

BACKGROUND OF THE INVENTION

The present invention relates to a method and an apparatus for the surface heat treatment of steel products by a laser beam. More particularly, the present invention is directed to such a method and an apparatus for such treatment of substantially V-shaped steel surfaces of steel products such as racks and gears.

It is known in various technologies that certain uneven surfaces of steel products, such as substantially V-shaped surfaces of steel products such as the teeth of racks and gears, must be treated, normally by a heat treatment, to increase the strength of such surfaces. Current practical industrial methods employed to achieve such strengthening include electromagnetic induction heating, carburizing, etc. However, such known strengthening methods are not altogether satisfactory from the viewpoint of strength, since the crests of such surfaces are generally excessively treated. Additionally, in carrying out such known processes, energy losses are substantial, and considerable distortion of the surfaces during the heat treatment results. Therefore, development work has been attempted to provide new methods for strengthening such surfaces.

Specifically, there have recently been conducted tests to employ electron beams and/or laser beams as sources of heat. Particularly, electron beam technology has already reached the level of practical application for welding. Heat treatment of flat steel surfaces by means of laser beam and/or electron beam technology will likely be achieved more and more in the future. However, the application of such technologies to uneven steel surfaces, such as those of racks and gears, still presents a number of practical problems, and as of yet no thoroughly practical industrial applications have been developed. More particularly, with reference now to FIG. 4 of the drawings, there will be illustrated the result of the heat treatment of a substantially V-shaped steel surface of a rack by means of a high energy beam in the form of a laser beam, such beam being applied to the steel surface in a heretofore known manner. More particularly, as will be apparent in FIG. 4, when the laser beam is projected substantially perpendicularly of the rack, and substantially perpendicularly of the bottom land of the V-shaped surface, the resultant hardened layer of the surface is much thicker at the bottom land of the surface than at the adjacent flank surfaces. This obviously results in an extremely uneven heat treatment, and the actual results of such heat treatment are highly undesirable. More particularly, in order to form hardened layers of desirable thickness on the flank surfaces, dissolution of the bottom land surface is inevitable. On the other hand, to form a hardened layer on the bottom land surface without dissolution thereof, it is virtually impossible to form hardened layers of suitable and sufficient thickness on the flank surfaces.

The above inherent disadvantages of the heat treatment shown in FIG. 4 particularly result when the laser beam has a Gaussian distribution of energy, wherein the energy is highest at the center of the beam and is increasingly lower toward the periphery of the beam. Consequently, the bottom land surface is heated to a much higher extent because the center of the beam with higher energy is projected onto the bottom land surface, while the flank surfaces are heated to a lesser extent by the periphery of the beam containing lower energy.

One previous attempt to solve the above discussed problem involves the use of a laser beam having an even energy distribution throughout the entire beam area, i.e. the use of a so-called "top-hat" type energy distribution. However, even when employing such a beam, it has still not been possible to obtain a desired uniformity of heat treatment of a surface profile as shown in FIG. 4, for the following reasons. That is, and again with reference to FIG. 4, if the angle formed between the flank surfaces is 40°, then the angle of incidence of the laser beam on the bottom land surface is 90°, that is the deviation from a perpendicular angle of incidence is 0°. On the other hand, at a point on one of the flank surfaces, the deviation of the angle of incidence from perpendicular to the flank surface is 70°. It will be apparent therefore that there will be a much higher degree of energy absorption at the bottom land surface than at the flank surfaces.

Moreover, those portions of the laser beam which are projected onto the flank surfaces are repeatedly reflected therefrom and directed toward the bottom land surface, thereby contributing to the further heating of the bottom land surface.

The results of the above phenomenon are that the hardened layer formed (shown by the hatched area in FIG. 4) is relatively thinner at the flank surfaces, i.e. whereat relatively thicker hardened layers are desired, and is thicker at the bottom land surface, i.e. whereat relatively thinner hardened layers are desired. These results have prevented the practical application of high energy beams, such as electron beams and laser beams, to the surface treatment of the surfaces of racks and gears.

SUMMARY OF THE INVENTION

With the above discussion in mind, it is the primary object of the present invention to provide a method and an apparatus for the surface heat treatment of steel products, such as a substantially V-shaped steel surface of a gear or a rack, while avoiding the above discussed disadvantages.

A further object of the present invention is to provide such a method and an apparatus whereby it is possible to heat treat substantially V-shaped steel surfaces by means of laser beams, and to thereby increase the mechanical strength of such surfaces by forming hardened layers of desirable form and thickness.

The above objects are achieved in accordance with the present invention by directing a substantially parallel laser beam from a laser beam transmitter toward a substantially V-shaped steel surface including first and second flank surfaces. A convex lens has a focal length (f) which meets the condition of $r/f \geq 0.268$, wherein (r) is the diameter of the laser beam. Such convex lens is positioned in the path of the laser beam such that the focal point of the convex lens is between the convex lens and the V-shaped surface, and such that the laser beam is diverged from the focal point and is projected against the first and second flank surfaces, thus subjecting the first and second flank surfaces to heat treatment.

Preferably, the diverged laser beam is projected from the focal point of the convex lens against the first and second flank surfaces in directions as close as possible to perpendicular thereto.

Thereby, it is possible to perform a heat treatment comprising hardening the V-shaped surface, wherein the flank surfaces are hardened to a greater thickness at the outer or crest ends thereof than at the centers thereof.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figures 1, 4:
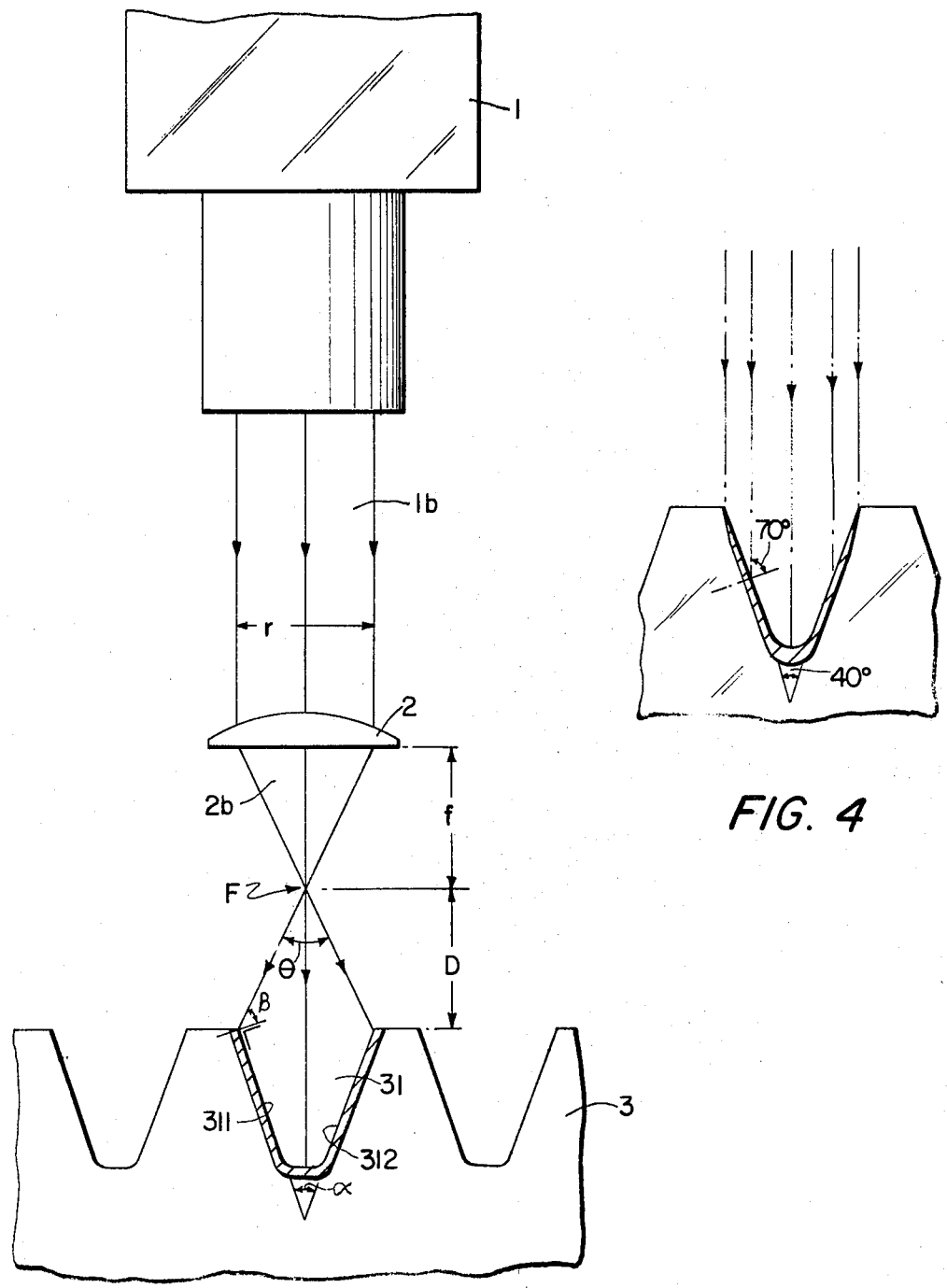
FIG. 1 is a schematic diagram illustrating an embodiment of the present invention.
FIG. 4 is a schematic diagram illustrating the application of a laser beam in a heretofore known manner against a substantially V-shaped surface.

With reference now to FIG. 1, an embodiment of the invention will be described. The fundamental inventive concepts of the present invention involve directing a substantially parallel laser beam 1b from a laser beam transmitter 1 in a direction toward a substantially V-shaped surface of a rack 3, the V-shaped surface including first and second flank surfaces 311 and 312, respectively, which substantially face each other and which are inclined with respect to each other by a specific angle $\alpha$, to thereby define a space 31. There is provided a convex lens 2 having a focal length (f) which meets the condition of $r/f \geq 0.268$, wherein (r) is the diameter of laser beam 1b. Convex lens 2 is positioned in the path of laser beam 1b, such that the focal point F of convex lens 2 is between convex lens 2 and the rack 3. Thereby, the convex lens 2 focuses the laser beam so that upon passage through the convex lens 2 the laser beam is first converged toward point F and then is dispersed or diverged at a wide angle, in the form of laser beam 2b.

Accordingly, the laser beam 2b which diverges at a wide angle is projected against the first and second flank surfaces 311 and 312, respectively, thereby subjecting such flank surfaces to a heat treatment, and specifically forming a hardened layer, shown by the hatched lines in FIG. 1.

The laser beam 2b, after being focused at focal point F, is then diverged and diffused from the focal point F at the angle $\theta$, and is thereby projected onto the flank surfaces from the outer or crest edges thereof to the bottom land edges thereof.

The diffusion angle $\theta$ may be expressed by the equation:

$$\theta = 2 \tan^{-1} \frac{r}{2f} \tag{1}$$

In FIG. 1, if the angle defined by the flank surfaces 311 and 312 is $\alpha$, and if the periphery of laser beam 2b is directed toward a flank surface at an angle of incidence deviating from a perpendicular angle by an angle $\beta$ (in FIG. 1 the periphery of the laser beam 2b strikes the flank surface at the outer or crest edge thereof), then the following equation can be established:

$$\frac{\theta}{2} + \frac{\alpha}{2} + \beta + 90° = 180° \tag{2}$$

From equations (1) and (2), it follows that:

$$\beta = (90° - \frac{\alpha}{2}) - \tan^{-1} \frac{r}{2f} \tag{3}$$

The value of $\beta$ should preferably be as close to zero as possible, since more of the laser beam energy is absorbed as the angle of incidence more closely approaches perpendicular to the flank surface. The first term on the right side of equation (3) above, i.e. $90° - (\alpha/2)$, is a characteristic value determined by the particular shape of the rack or gear and can theoretically be within the range of 0° to 90° (since $0° < \alpha < 180°$). In practice however, the value of $\alpha$ is limited to be within the range of 29° to 52°, due to various industrial standards. Therefore, the value of $90° - (\alpha/2)$ will practically be within the range of 64° to 76.5°. When the value of r/2f is selected to enable $\beta = 0$, within the above mentioned range of $\alpha$, then the energy absorption will be the highest at the area or section where the periphery of the beam 2b is projected. Also, energy absorption will be reduced in directions toward the bottom land, since the angles of incidence will increasingly deviate from the perpendicular. The angle of incidence at the actual bottom land of the space 31 is perpendicular.

By the heat treatment according to the present invention, the energy absorption will increase toward the outer or crest edges of the flank surfaces, and the energy absorption on the flank surfaces will decrease in directions toward the bottom land. Further, the laser beam is diffused before being projected on the flank surfaces 311 and 312. Accordingly, energy diffusion is possible even when employing a laser beam having a Gaussian distribution, and therefore a hardened layer of a desired uniformity of thickness may be formed on the flank surfaces.

The value of r/2f which is selected, based on the above equation (3), need not be such that the angle $\beta$ is precisely 0°, but can be such that $\beta$ is as close to 0° as possible.

Results of experiments employing various combinations of $\alpha$, f and r have determined that hardened layers of desirable configuration and thickness could be formed when $r/f \geq 0.268$, and almost no fluctuations of the hardened layer occurred due to variations of $\alpha$. This is believed to be due to the fact that the variation of $\alpha$ is insignificant within the above mentioned practical limitation of 29° to 52°, since the laser beam is diffused at a wide angle, and since any reflection effects at flank surfaces 311 and 312 overlap.

It has accordingly been found that the only critical practical requirement is that the laser beam and convex lens be selected to that the condition of $r/f \geq 0.268$ is met, with the exception of some very special cases. It has also been determined that, in certain practical applications, the desired effect can be obtained even with a somewhat larger value of $\beta$.

Since the diameter of diffused beam 1b, as projected onto the V-shaped surface, is dependent upon the distance D, i.e. the distance between the focal point F and the crest surface of the rack, distance D should be adjusted so that the beam 2b can be projected over the entire V-shaped surface and to thereby enable heat treatment of the entire V-shaped surface. However, the distance D may be such that the periphery of the beam 2b may be projected over a somewhat expanded area, i.e. such that at least portions of the flat sections of the top of the crests may be covered.

If the width, i.e. the dimension perpendicular to the plane of FIG. 1, of rack 3 is larger than the diameter of the projected beam 2b, then projection scanning of the beam in a direction parallel to the width of the rack may be performed. Furthermore, it will be understood that for the heat treatment of a number of teeth surfaces or spaces of the rack, then the rack will be indexed by one pitch for each heat treatment operation.

Figure 2:
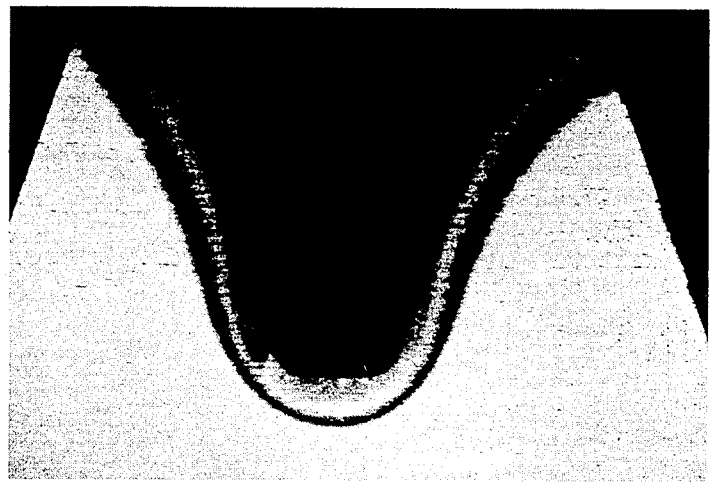
FIG. 2 is an enlarged microphotograph of a surface heat treated according to the embodiment of the invention illustrated in FIG. 1.
Figure 3:
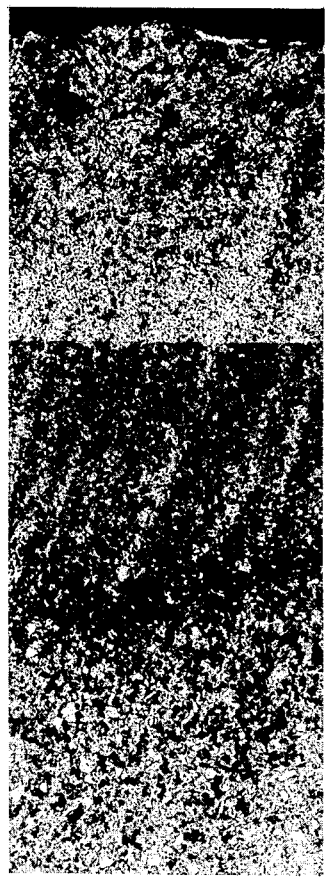
FIG. 3 is a further enlarged microphotograph illustrating the bottom land surface of the treated and hardened surface shown in FIG. 2.

The optimum range of energy density of the laser beam at the projection area onto the flank surfaces is $10^2$ to $10^5$ watt/mm$^2$. The projection time of the laser beam and/or the scanning speed thereof are selected so that the temperature of the projected area on the flank surfaces will exceed the transformation point but not the melting point of the material involved. FIGS. 2 and 3 are microphotographs of a surface treated in accordance with the arrangement of FIG. 1. Specifically, FIG. 2 is a microphotograph, magnified by a power of ten illustrating a hardened layer formed according to the present invention. Specifically, the hardened layer is relatively thicker toward the outer or crest edges of the flank surfaces and is thinner around the central portions of the flank surfaces. FIG. 3 is a microphotograph of the hardened area of the bottom land of FIG. 2, but magnified by a power of 100, and indicates the complete transformation of the harened layer into martensite.

More particularly, the rack shown in FIGS. 2 and 3 was treated under the following conditions:

Module of the rack (defined as the tooth pitch/$\pi$)=2.5

Pressure angle ($\alpha/2$)=20°

Laser beam transmitter: A single $CO_2$ gas laser beam transmitter, output=1.128 KW, laser beam diameter=17 mm$\phi$ f=63.4 mm r/f=0.268

D=29.4 mm

Laser beam scanning speed=150 mm/min.

In accordance with the above described arrangement of the present invention, the treated surfaces resulted in a hardened layer having thickened portions at the outer or crest edges of the flank surfaces and thinner portions at the centers of the flank surfaces, wherein the Vickers hardness of the hardened layer adjacent the crest ends of the flank surfaces and at the bottom land was more then six hundred, and wherein the Vickers hardness at the centers of the flank surfaces was more than four hundred.

Further, in accordance with the above described arrangement of the present invention, it is possible to obtain heat treatments of steel products by a high energy beam in the form of a laser beam providing the effect of self-quenching. Additionally however, in accordance with the present invention it is possible to provide for the formation of a hardened layer having a desired thickness distribution, without obtaining any softened zone due to dissolution or without any distortion of the heat treatment. Moreover, such heat treatment is possible in accordance with the present invention by the provision of only a single operating unit. Accordingly, the present invention provides a substantial improvement in the technology of heat treatment of steel products by laser beams.

Although the present invention has been described above and illustrated with respect to specific desired operational and structural features thereof, it is to be understood that various modifications may be made thereto without departing from the scope of the present invention.

What I claim is:

1. A method for heat treating a substantially V-shaped steel surface of a steel product such as a gear or rack, such V-shaped surface being defined by first and second flank surfaces substantially facing each other and inclined with respect to each other by a specific angle, said method comprising:

directing a substantially parallel laser beam toward a substantially V-shaped steel surface including first and second flank surfaces;

providing a convex lens having a focal length (f) which meets the condition of r/f≧0.268, wherein (r) is the diameter of said laser beam; and positioning said convex lens in the path of said laser beam such that the focal point of said convex lens is between said convex lens and said V-shaped surface, and such that said laser beam is diverged from said focal point and is projected against said first and second flank surfaces, thus subjecting said first and second flank surfaces to heat treatment.

2. A method as claimed in claim 1, wherein said laser beam is projected against said first and second flank surfaces in directions as close as possible to perpendicular thereto.

3. A method as claimed in claim 1, wherein said heat treatment comprises hardening said V-shaped surface, and wherein said flank surfaces are hardened to a greater thickness at the outer or crest ends thereto than at the centers thereof.

4. An apparatus for heat treating a substantially V-shaped steel surface of a steel product such as a gear or rack, such V-shaped surface being defined by first and second flank surfaces substantially facing each other and inclined with respect to each other by a specific angle, said apparatus comprising:

laser beam transmitter means for directing a substantially parallel laser beam toward a substantially V-shaped steel surface including first and second flank surfaces;

a convex lens having a focal length (f) which meets the condition of r/f≧0.268, wherein (r) is the diameter of said laser beam; and said convex lens being positioned in the path of said laser beam such that the focal point of said convex lens is between said convex lens and said V-shaped surface, whereby said convex lens forms means for diverging said laser beam from said focal point and projecting said laser beam against said first and second flank surfaces, and thus subjecting said first and second flank surfaces to heat treatment.

* * * * *